United States Patent [19]
Martin

[11] 4,087,827
[45] May 2, 1978

[54] ELECTRODE AND MULTI-ELECTRODE RECORDING HEAD FOR A GRAPHIC RECORDING APPARATUS

[75] Inventor: Guy Noël Martin, Sucy en Brie, France

[73] Assignee: U.S. Philips Corporation, New York, N.Y.

[21] Appl. No.: 730,676

[22] Filed: Oct. 7, 1976

[30] Foreign Application Priority Data

Oct. 9, 1975 France .................. 75 30914

[51] Int. Cl.² ........................................ G03G 15/18
[52] U.S. Cl. ........................ 346/155; 346/139 C
[58] Field of Search ............ 346/155, 153, 165, 139 C

[56] References Cited
U.S. PATENT DOCUMENTS

| | | | |
|---|---|---|---|
| 2,963,336 | 12/1960 | Chambers | 346/165 |
| 3,267,485 | 8/1966 | Howell | 346/155 |
| 3,470,563 | 9/1969 | Starr | 346/155 |
| 3,781,904 | 12/1973 | Firnig | 346/165 |

*Primary Examiner*—Jay P. Lucas
*Attorney, Agent, or Firm*—Frank R. Trifari; David R. Treacy

[57] ABSTRACT

An electrode and a recording head made of a plurality of electrodes. Each electrode has a mounting portion and a flexible portion having a resilient tongue and an arm provided with a recording tip on its end, all formed by a thin unitary metal plate. The insulated and assembled electrodes together constitute the recording head. The electrodes are aligned by means of two members which project through holes in the mounting portions of the electrodes, and recesses aligned in an edge of each electrode form a groove for an electrical connection plate.

8 Claims, 5 Drawing Figures

ELECTRODE AND MULTI-ELECTRODE RECORDING HEAD FOR A GRAPHIC RECORDING APPARATUS

BACKGROUND OF THE INVENTION

1. Field of the Invention

The invention relates to an electrode for a recording head of the type comprising a plurality of metal electrodes, arranged in a row and insulated relative to each other, for recording information on an electro-sensitive record carrier, transportable perpendicularly to the direction of the row, in a graphic recording apparatus. The invention also relates to a recording head of this kind.

2. Description of the Prior Art

The electrodes of known recording heads of this type are formed by wires or strips of conductive material, the electrodes being insulated with respect to each other and their longitudinal portion including at least one free, bent portion which is situated in the vicinity of the recording tip of the electrodes. This free, bent portion imparts enough flexibility to the electrode to compensate for the wear of the electrode and to mitigate the drawbacks due to the irregularities of the surface of the record carrier (for example, see U.S. Pat. Nos. 3,419,886 and 2,928,708 and French Pat. Nos. 1,532,467 and 2,216,876).

SUMMARY OF THE INVENTION

The object of the invention is to provide an electrode which can be manufactured in a very simple manner and which enables simple and reliable assembly of the recording head with easy electrical connection of the electrodes.

To this end, the electrode in accordance with the invention is characterized in that the electrode is made from a thin, metal plate and consists of mounting and bending portions, the mounting portion being wide, much wider than its thickness and shaped so that it is suitable for assembly with other electrode mounting portions in the desired position relative to each other in order to form the recording head, the assembly of the mounting portions serving as a carrier for a connecting member for electrically connecting the electrodes to associated power supply members; and the bending portion being comparatively narrow and having a free end portion which is widened in order to form a recording tip, a very narrow elongated resilient tongue, and a comparatively rigid arm extending between the free end portion and an end of the tongue, the other tongue end which is remote from the arm extending from the mounting portion.

According to another aspect of the invention, a plurality of these electrodes are arranged side by side, the mounting portions of adjacent electrodes being separated by insulating material, with at least one mounting pin extending through aligned holes in the mounting portions.

The invention will be described in detail hereinafter with reference to the accompanying diagrammatic drawing.

DESCRIPTION OF THE PREFERRED EMBODIMENT

Figure 1:
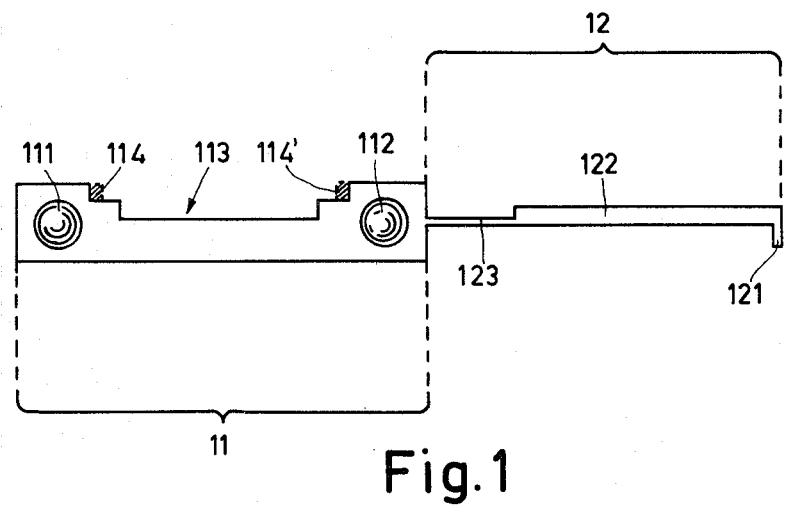
FIG. 1 is a side view of an embodiment of the electrode in accordance with the invention.

The electrode shown in FIG. 1 is a unitary metal plate which is formed (chemically, mechanically or in some other way) from a foil, for example, of molybdenum. Thus, the thickness of the electrode is constant and very small in order to provide, as has already been indicated, small recording tips which can be situated near each other (the thickness of the metal foil is, for example, 0.2 mm).

The electrode comprises two portions which extend from each other; that is, a mounting portion 11 and a bending portion 12. The mounting portion 11 is comparatively wide (for example, 4 mm); this portion has two through hole or apertures 111 and 112 and a recess 113. The apertures 111 and 112 serve for the passage of perpendicular mounting pins during the assembly of a recording head comprising a plurality of electrodes. It will be obvious that at least two mounting pins are required passing through the side surfaces of the mounting portions for simultaneously obtaining correct alignment of all electrodes. The recess 113 serves to insert a connection plate for connecting the electrodes. FIG. 1 shows two shaded parts 114 and 114', one on each side of the recess 113. The meaning of these parts will be described hereinafter.

The bending portion 12 is comparatively narrow and has a free end portion which is widened in order to form a recording tip 121 (the heighth of the recording tip is, for example, 2 mm). This recording tip is connected, by way of a comparatively rigid arm 122 (width, for example, 1 mm), to the other end portion 123 which is very narrow (for example, 0.2 mm) and which forms a resilient tongue whose end which is remote from the arm 122 extends from the mounting portion 11. The tongue 123 behaves as a flexible, resilient strip, one end of which is clamped, so that this strip provides the contact pressure required at the area of the recording tip 121 and compensates for all level differences due to either the rapid variations of the thickness of the moving record carrier or the gradual wear of the recording tip. The movements of the tongue 123 are magnified and transferred to the recording tip 121 by the arm 122.

Figure 2:
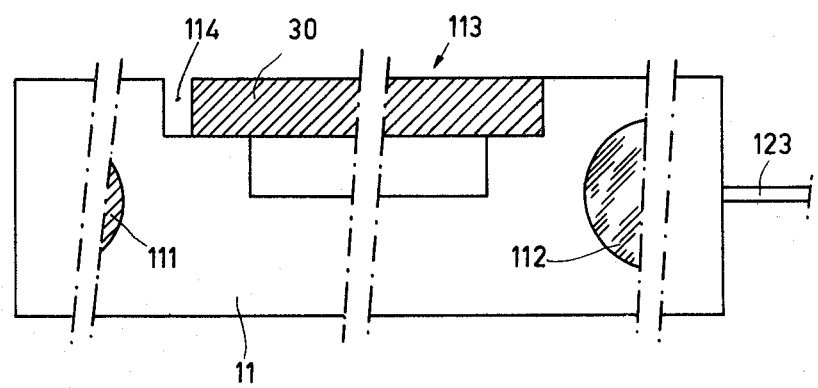
FIG. 2 is a partial sectional side view of a recording head comprising a number of electrodes as shown in FIG. 1.
Figure 3:
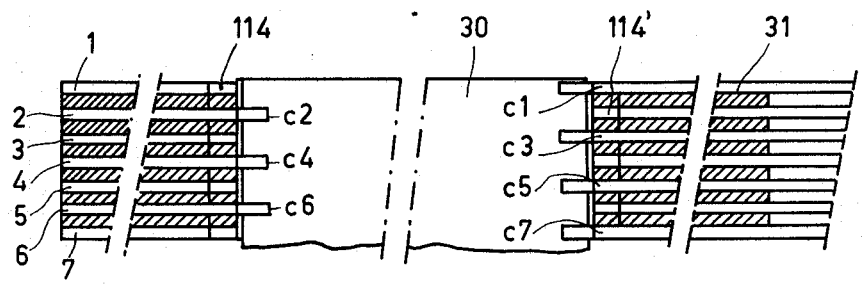
FIG. 3 is a partial plan view of the recording head shown in FIG. 2.

FIGS. 2 and 3 show (at an enlarged scale) a sectional view (at the area of an electrode) and a plan view, respectively, of a part of a recording head comprising a plurality of electrodes at the area of the mounting 11 of the electrode. Besides the mounting portion 11, FIG. 2 also shows part of the tongue 123 and, in a partial sectional view, the mounting pins which project through the openings 111 and 112.

The electrode shown in FIG. 2 is furthermore provided with an additional cut out recess at the area of the shaded part 114 shown in FIG. 1. A cut-out of this kind at the area of the part 114 is provided, as is shown in FIG. 3 in each of the electrodes 1, 3, 5 and 7 of the recording head. Similarly, an additional cut-out recess is provided in the electrodes 2, 4, 6 at the area of the part 114'. In the groove formed by the aligned recesses 113 of the aligned electrodes a connection plate 30 is arranged for electrical connection of the electrodes.

FIG. 3 illustrates how the recording head is composed of mutually insulated electrodes. The insulating portions 31 between the side surfaces of each two electrodes are shown to be shaded. The pitch between the electrodes at the area of the connections C1...C7 formed on the plate 30 is doubled by each time arranging adjacently (with insertion of insulating members 31) an electrode having an additional cut-out 114 (electrodes 1, 3, 5 and 7) and an electrode having an additional cut-out 114' (electrodes 2, 4, and 6) bounding the oppositely situated edges of the connection plate. The electrical connection between the electrodes and these connections can be realized in any well known manner, for example, by means of conductive epoxy resins, by soldering or by way of a connection wire which is connected by thermocompression or by welding between the plate and a connection zone provided on the electrode.

These electrical connections are provided at the area of the flanks of the recess 113 of the electrodes which are not provided with an additional recess. It will be obvious that the plate 30 can also be used as a carrier for all members included in the circuits of the power supply device for the electrodes.

Figure 4:
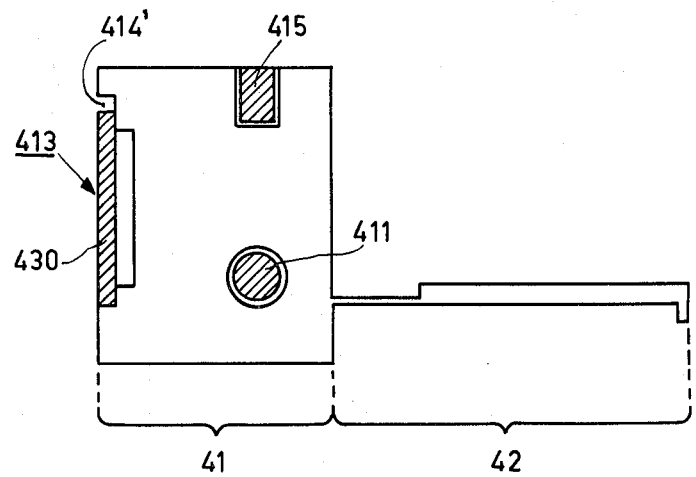
FIG. 4 is a sectional side view of a recording head utilising electrodes whose shape differs from that of the electrode shown in FIG. 1.

FIG. 4 is a sectional view of a recording head utilizing electrodes whose shape differs from that of the electrode shown in FIG. 1. The section which is denoted by the reference 42 fully corresponds to the bending portion 12 of the electrode shown in FIG. 1. However, the mounting portion 41, having the same function as the portion 11 of the electrode shown in FIG. 1, has a different shape which will be described hereinafter.

The recess 413 in each electrode is identical to and has the same function as the recess 113 provided in the electrode shown in FIG. 1, which means that a connection plate 430 is disposed in the groove formed by the aligned recesses of the electrodes of the recording head. Like the recording head shown in FIG. 2, the recording head shown in FIG. 4 is assembled by adjacently arranging the electrodes (of course with insertion of insulating parts between the mounting portion side surfaces) provided with an additional recess (414' in FIG. 4) in order to double the pitch of the electrodes at the area of the connections. The electrode shown in FIG. 4, however, has only one hole 411 for the passage of one mounting pin (shown in sectional view), but is provided with a notch 415 to accommodate a positioning strip in the assembly formed by the adjacently arranged electrodes which together constitute the head.

Figure 5:
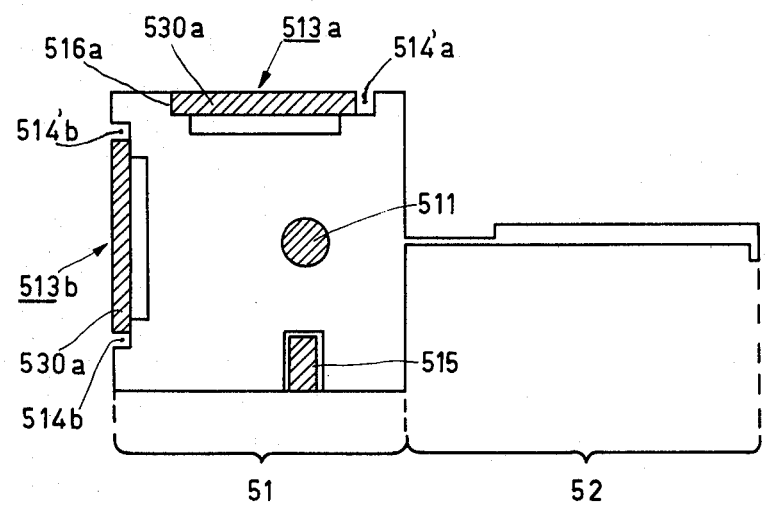
FIG. 5 is a sectional view, corresponding to that of FIG. 4, of a further embodiment of a recording head.

In FIG. 5, the members corresponding to those shown in FIG. 4 are denoted by corresponding reference numerals; for example, the assembly 52 formed by the tongue, the arm and the recording tip, the mounting portion 51, the opening 511 for the passage of a mounting pin which is shown in a cross-sectional view.

the notch 515 for inserting a positioning strip which is also shown in a cross-sectional view.

In the alternative embodiment of the recording head shown in FIG. 5, however, the dimensions of the electrode at the area of the mounting portion are different in order to enable two connection plates 530a and 530b to be accommodated on two surfaces of the recording head, the said plates being inserted in two grooves formed by the recesses 513a and 513b in different edges of the electrode mounting portions. As in the described embodiments, additional recesses are provided in the flanks of the recesses 513a and 513b. However, in this case there are three additional recesses for each electrode, and the electrodes (and the insulating parts) are again adjacently arranged, so that an electrode is in direct contact with a connection plate at one flank of one of the recesses 513a and 513b, so that the distance between the connections of a head is quadrupled at the area of the electrodes. For example, in the electrode shown the additional recesses 514b, 514'b and 514'a are provided. The joint of that electrode is, therefore, situated at the area of the flank 516a of the recess 513a.

The insulating parts (like the parts 31 in FIG. 3) of a recording head in accordance with the invention, provided between the adjacent side by side electrodes, can be formed by loose elements of a suitable insulating material. After the manufacture of the electrodes, they can be electrically insulated by means of lacquer, an insulating material, an oxidation treatment etc,, with the exception of the recording portions and the electrical connection portions. When the elements are combined to form the recording head, the pitch required between the electrodes is determined by the thickness of the electrodes and the thickness of the insulating intermediate elements.

Assembly and mechanical interconnection is preferably obtained by impregnation with an insulating material or a resin on the rear portion of the electrodes, a comb being used for positioning the electrodes, the comb determining the pitch between the electrodes of the recording head obtained.

What is claimed is:

1. An electrode for a recording head comprising a plurality of metal electrodes, arranged in a side by side row and insulated relative to each other, for recording information on an electro-sensitive record carrier in a graphic recording apparatus, the carrier being transportable perpendicularly to the direction of the row, wherein the electrode is made from a unitary thin, metal plate and consists of mounting and bending portions, the mounting portion having a width much greater than thickness and shaped so that it is suitable for assembly with other electrode mounting portions in a row aligned relative to each other to form the recording head, the assembly of the mounting portions serving as a carrier for a connecting member for electrically connecting the electrodes to associated power supply members; and the bending portion being comparatively narrow and having a free end portion which is widened in the direction of width of the mounting portion to form a recording tip, a very narrow elongated resilient tongue, and a comparatively rigid arm extending between the free end portion and an end of the tongue, the other tongue end which is remote from the arm extending from the mounting portion.

2. An electrode as claimed in claim 1 wherein said metal plate has a thickness of approximately 0.2mm.

3. An electrode as claimed in claim 2 wherein said tongue has a width of approximately 0.2mm, said arm having a width greater than said tongue, and said mounting portion having a width greater than the width of the comparatively rigid arm.

4. An electrode as claimed in claim 2 wherein said mounting portion has a side surface extending in the direction of plate width; and the mounting portion has a hole therethrough perpendicular to said side surface for a mounting pin, and a recess extending along an edge of the mounting portion side surface, the tongue extending from another edge of the mounting portion.

5. A recording head for recording information on an electro-sensitive record carrier in a graphic recording apparatus, comprising:

a plurality of metal electrodes arranged side by side in a row, each electrode being made from a unitary thin, metal plate and consisting of mounting and bending portions; each mounting portion having a side surface extending in the direction of plate width, the mounting portion having a hole therethrough perpendicular to the side surface, and a recess extending along an edge of a mounting portion side surface; the bending portion being comparatively narrow and having a free end portion which is widened to form a recording tip, a very narrow elongated resilient tongue, and a comparatively rigid arm extending between the free end portion and an end of the tongue, the other tongue end which is remote from the arm extending from another edge of the mounting portion;

a mounting member extending through the respective holes in said mounting portions;

means for insulating said electrodes from each other; and means for making respective electrical connections to said electrode mounting portions.

6. A recording head as claimed in claim 5 wherein said mounting portion recesses are aligned to form a groove, and the recording head further includes a connection plate extending along said groove and having a plurality of connection points, each connection point being electrically connected to a mounting portion of a respective electrode.

7. A recording head as claimed in claim 6 wherein each recess in an electrode mounting portion is extended at one end of the recess by an additional recess, the additional recesses of adjacent electrodes bounding oppositely situated edges of the connection plate, each mounting portion being electrically connected to the connection plate at a flank of the recess opposite the additional recess of that mounting portion.

8. A recording head as claimed in claim 6 wherein each mounting portion additionally has a notch along one edge, the notches being aligned to form a second groove, and the recording head additionally includes a positioning strip located in said second groove.

* * * * *